(12) United States Patent
Ha et al.

(10) Patent No.: US 10,133,685 B2
(45) Date of Patent: Nov. 20, 2018

(54) BUS INTERFACE DEVICE THAT MERGES DATA REQUEST SIGNALS, SEMICONDUCTOR INTEGRATED CIRCUIT DEVICE INCLUDING THE SAME, AND METHOD OF OPERATING THE SAME

(71) Applicant: SAMSUNG ELECTRONICS CO., LTD., Suwon-si, Gyeonggi-Do (KR)

(72) Inventors: Jin Seok Ha, Hwaseong-si (KR); Seok Hoon Kim, Yongin-si (KR); Eui Cheol Lim, Hwaseong-si (KR); Jin Yong Jung, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 206 days.

(21) Appl. No.: 15/077,553

(22) Filed: Mar. 22, 2016

(65) Prior Publication Data

US 2016/0283416 A1    Sep. 29, 2016

(30) Foreign Application Priority Data

Mar. 23, 2015    (KR) .......................... 10-2015-0040278

(51) Int. Cl.
*G06F 13/14* (2006.01)
*G06F 13/16* (2006.01)
*G06F 12/084* (2016.01)

(52) U.S. Cl.
CPC ........ *G06F 13/1642* (2013.01); *G06F 12/084* (2013.01); *G06F 13/1673* (2013.01); *G06F 2212/401* (2013.01); *G06F 2212/455* (2013.01)

(58) Field of Classification Search
CPC .............. G06F 9/30036; G06F 9/3016; G06F 9/30145; G06F 12/0875

USPC ......................................................... 710/310
See application file for complete search history.

(56) References Cited

U.S. PATENT DOCUMENTS

| | | | |
|---|---|---|---|
| 6,075,523 A | 6/2000 | Simmers | |
| 6,122,715 A * | 9/2000 | Palanca | G06F 12/0804 711/154 |
| 6,366,984 B1 * | 4/2002 | Carmean | G06F 12/0804 710/52 |
| 6,434,639 B1 * | 8/2002 | Haghighi | G06F 12/0831 710/35 |
| 6,636,221 B1 | 10/2003 | Morein | |
| 6,996,645 B1 * | 2/2006 | Wiedenman | G06F 12/0831 710/107 |
| 8,619,866 B2 | 12/2013 | Zhou et al. | |

(Continued)

FOREIGN PATENT DOCUMENTS

| | | |
|---|---|---|
| JP | 2009-100361 | 5/2009 |
| JP | 2012-205107 | 10/2012 |

*Primary Examiner* — Titus Wong
(74) *Attorney, Agent, or Firm* — F. Chau & Associate, LLC

(57) ABSTRACT

A bus interface device for requesting and receiving data from a memory controller connected to a bus includes a request buffer and a request merger. The request buffer is configured to store a first data request signal for requesting first data and a second data request signal for requesting second data. The request merger is configured to determine whether to merge the first and second data request signals, and transmit a merged request signal for requesting the first data and the second data from the memory controller to the bus upon determining that the first and second data request signals are to be merged.

15 Claims, 10 Drawing Sheets

(56) References Cited

U.S. PATENT DOCUMENTS

| | | | |
|---|---|---|---|
| 8,730,328 B2 | 5/2014 | Luo et al. | |
| 2007/0079044 A1* | 4/2007 | Mandal | G06F 13/404 |
| | | | 710/310 |
| 2007/0080971 A1 | 4/2007 | Sung | |
| 2009/0225096 A1 | 9/2009 | Yoshiga et al. | |
| 2012/0120083 A1 | 5/2012 | Kong et al. | |
| 2013/0314429 A1 | 11/2013 | Croxford et al. | |
| 2014/0207744 A1 | 7/2014 | Carney | |
| 2014/0219558 A1 | 8/2014 | Teng et al. | |
| 2014/0219573 A1 | 8/2014 | Teng et al. | |

\* cited by examiner

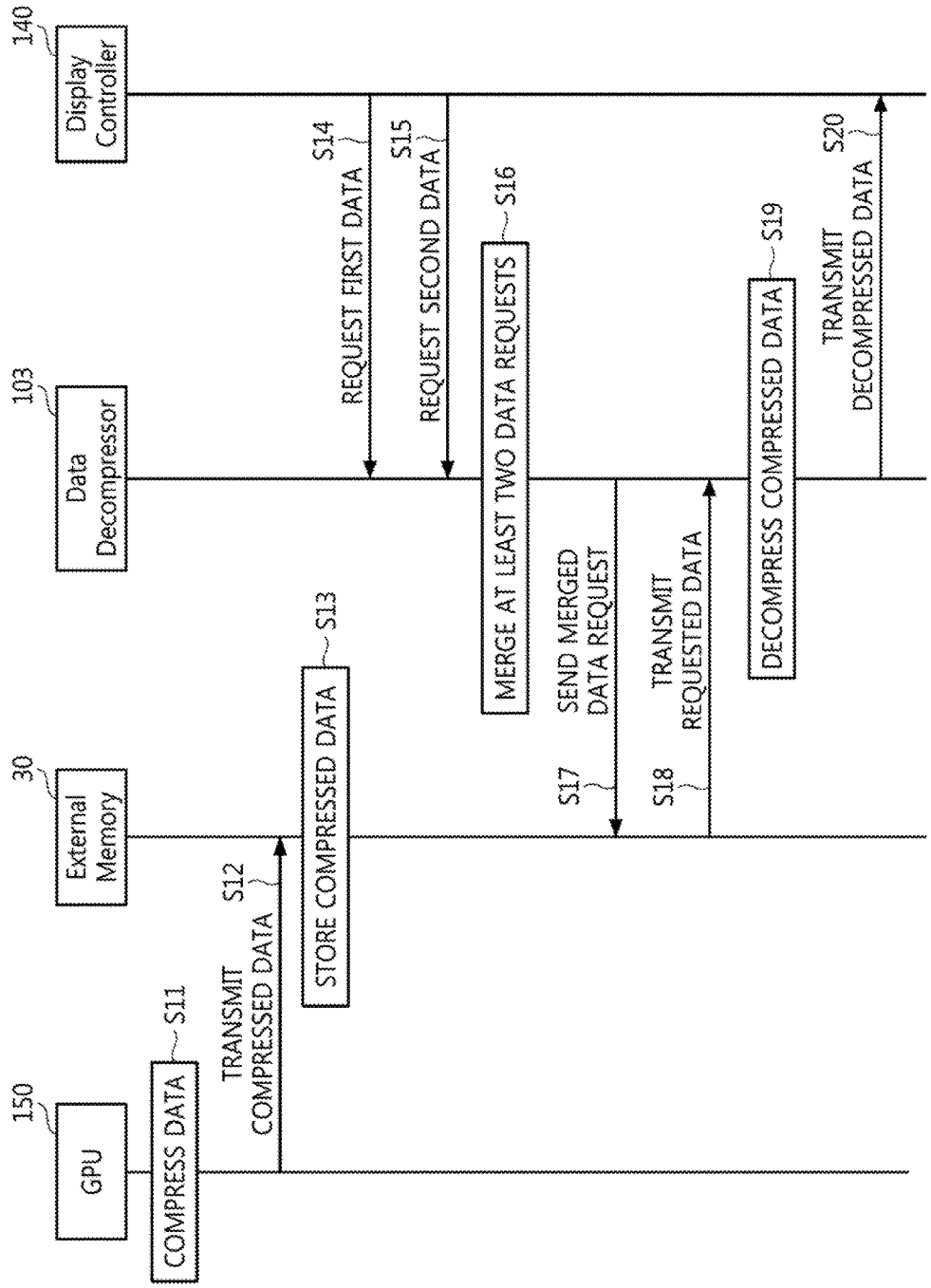

BUS INTERFACE DEVICE THAT MERGES DATA REQUEST SIGNALS, SEMICONDUCTOR INTEGRATED CIRCUIT DEVICE INCLUDING THE SAME, AND METHOD OF OPERATING THE SAME

CROSS-REFERENCE TO RELATED APPLICATIONS

This application claims priority under 35 U.S.C. § 119 to Korean Patent Application No. 10-2015-0040278 filed on Mar. 23, 2015, the disclosure of which is hereby incorporated by reference in its entirety.

TECHNICAL FIELD

Exemplary embodiments of the inventive concept relate to a bus interface device including a bus and a semiconductor integrated circuit (IC) device including the bus interface, and more particularly, to a bus interface device for efficiently interfacing with a bus, a semiconductor IC device including the same, and a method of operating the same.

DISCUSSION OF THE RELATED ART

As the resolution of display devices such as liquid crystal display (LCD) devices and the complexity of the operations of electronic devices including such display devices increase, data transmission traffic for driving the display devices and/or data transmission traffic in an application processor (AP) of the display devices is increasing. Therefore, the bandwidth for data transmission is also increasing.

SUMMARY

According to exemplary embodiments of the inventive concept, there is provided a bus interface device for requesting and receiving data from a memory controller connected to a bus. The bus interface device includes a request buffer configured to store a first data request signal for requesting first data and a second data request signal for requesting second data, and a request merger configured to determine whether to merge the first and second data request signals and transmit a merged request signal for requesting the first data and the second data from the memory controller at substantially the same time to the bus according to a determination result.

The first and second data may be compressed data. The bus interface device may further include a cache, and a decoder logic circuit configured to receive the first and second data from the memory controller, to store the first and second data in the cache, and to decompress the first and second data.

The request merger may merge the first and second data request signals when the first and second data are consecutive.

The request merger may not immediately transmit a first memory request signal for requesting the first data from the memory controller to the bus, but rather, may wait for the second data request signal when the first data is less than a threshold.

According to exemplary embodiments of the inventive concept, there is provided a semiconductor integrated circuit device including a bus, a memory controller connected to the bus and configured to control memory, and a bus interface module configured to request data from a memory controller through the bus.

The bus interface module includes a request buffer configured to store a first data request signal for requesting first data and a second data request signal for requesting second data, and a request merger configured to determine whether to merge the first and second data request signals and to transmit a merged request signal for requesting the first data and the second data from the memory controller at substantially the same time to the bus according to a determination result.

The request merger may merge the first and second data request signals when the first and second data are consecutive.

The request merger may not immediately transmit a first memory request signal for requesting the first data from the memory controller to the bus, but rather, may wait for the second data request signal when the first data is less than a threshold.

The decoder logic may analyze the first data request signal and the second data request signal, may determine whether the first and the second data have been stored in the cache, and may send a request to the request merger when the first and the second data have not been stored in the cache.

According to exemplary embodiments of the inventive concept, there is provided a method of operating a bus interface device for interfacing with a memory through a bus. The method includes receiving a first data request signal, determining whether a request of first data from the memory is necessary, determining whether a request condition is satisfied when the request of the first data from the memory is necessary, waiting for a second data request signal when the request condition is not satisfied, and transmitting a first memory request signal for requesting the first data from the memory to the bus when the request condition is satisfied.

Determining whether the request condition is satisfied may include determining whether a size of the first data is less than a predetermined threshold.

The method may further include receiving the second data request signal, determining whether a request of second data from the memory is necessary, merging the request of the first data and the request of the second data when request of the second data from the memory is necessary, and transmitting a second memory request signal including a merged request to the bus.

The method may further include determining whether the merged request satisfies the request condition and waiting for a third data request signal when the merged request does not satisfy the request condition.

According to exemplary embodiments of the inventive concept, a bus interface device for requesting and receiving data from a memory controller connected to a bus is provided. The bus interface device includes a request buffer configured to store a first data request signal for requesting first data and a second data request signal for requesting second data, and a request merger configured to determine whether to merge the first and second data request signals, and transmit a merged request signal for requesting the first data and the second data from the memory controller to the bus upon determining that the first and second data request signals are to be merged.

According to exemplary embodiments of the inventive concept, a semiconductor integrated circuit device includes a bus, a memory controller connected to the bus and configured to control a memory, and a bus interface module configured to request data from the memory controller through the bus. The bus interface module includes a request buffer configured to store a first data request signal for requesting first data and a second data request signal for requesting second data, and a request merger configured to determine whether to merge the first and second data request signals, and transmit a merged request signal for requesting the first data and the second data from the memory controller to the bus upon determining that the first and second data request signals are to be merged. The first and second data are stored in the memory.

According to exemplary embodiments of the inventive concept, a method of operating a bus interface device for interfacing with a memory through a bus is provided. The method includes receiving a first data request signal, determining whether a request of first data from the memory is necessary, determining whether a request condition is satisfied upon determining that the request of the first data from the memory is necessary, waiting for a second data request signal upon determining that the request condition is not satisfied, and transmitting a first memory request signal for requesting the first data from the memory to the bus upon determining that the request condition is satisfied.

According to exemplary embodiments of the inventive concept, a method of operating a bus interface device for interfacing with a memory through a bus is provided. The method includes compressing first data and second data by a graphics processing unit (GPU), transmitting the first data and the second data from the GPU to the memory, receiving a first data request signal corresponding to the first data at a bus interface module, in which the first data request signal is sent by a display controller, receiving a second data request signal corresponding to the second data at the bus interface module, in which the second data request signal is sent by the display controller, merging the first and second data request signals into a single merged data request signal by the bus interface module, and transmitting the single merged data request signal from the bus interface module to the memory.

BRIEF DESCRIPTION OF THE DRAWINGS

The above and other features of the inventive concept will become more apparent by describing in detail exemplary embodiments thereof with reference to the accompanying drawings, in which:

FIG. 4 is a flowchart of a method of operating an SoC according to exemplary embodiments of the inventive concept;

DETAILED DESCRIPTION OF THE EXEMPLARY EMBODIMENTS

Figure 1:
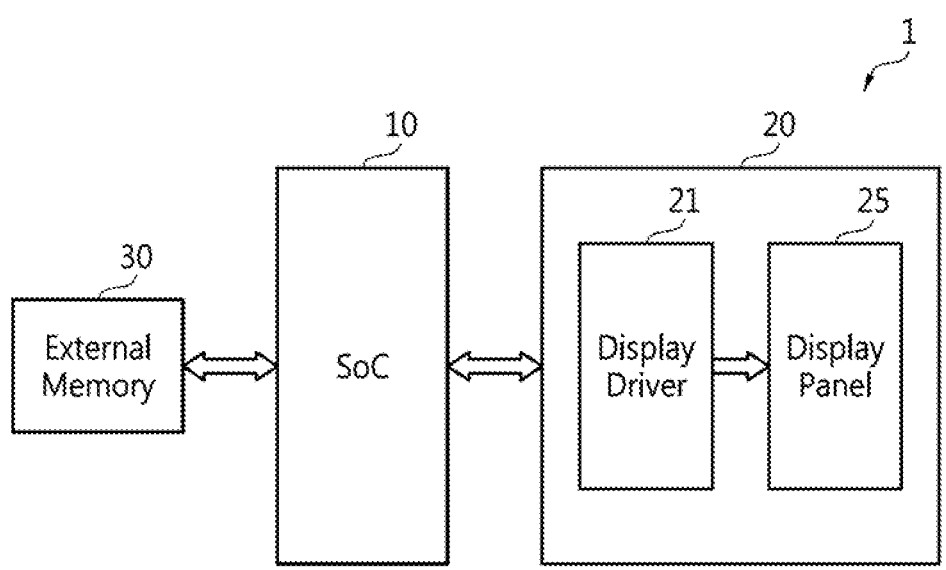
FIG. 1 is a block diagram of an electronic system including a semiconductor integrated circuit (IC) device according to exemplary embodiments of the inventive concept.

The inventive concept now will be described more fully hereinafter with reference to the accompanying drawings, in which exemplary embodiments of the inventive concept are shown. This inventive concept may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers may refer to like elements throughout the drawings.

It will be understood that when an element is referred to as being "connected" or "coupled" to another element, it can be directly connected or coupled to the other element or intervening elements may be present.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. Herein, when processes are described as being performed at substantially the same time, it is to be understood that the processes may be performed at exactly the same time or at about the same time as would be understood by a person having ordinary skill in the art.

FIG. 1 is a block diagram of an electronic system 1 including a semiconductor integrated circuit (IC) device according to exemplary embodiments of the inventive concept. The semiconductor IC device may be implemented as, for example, a system-on-chip (SoC) 10 or an application processor (AP). The electronic system 1 may be implemented as, for example, a portable electronic device such as a laptop computer, a cellular phone, a smartphone, tablet personal computer (PC), a personal digital assistant (PDA), an enterprise digital assistant (EDA), a digital still camera, a digital video camera, a portable multimedia player (PMP), a mobile internet device (MID), a wearable computer, an Internet of Things (IoT) device, or an Internet of Everything (IoE) device. The electronic system 1 may display a still image using a still image signal or a moving image (e.g., a video) using a video signal on a display panel 25.

A display device 20 includes a display driver 21 and the display panel 25. The SoC 10 and the display driver 21 may be implemented in a single module, a single SoC, or a single package (e.g., a multi-chip package). Alternatively, the display driver 21 and the display panel 25 may be implemented in a single module.

The display driver 21 controls the operation of the display panel 25 according to signals output from the SoC 10. The display driver 21 may transmit image data received from the SoC 10 as an output image signal to the display panel 25 through a selected interface.

The display panel 25 may display the output image signal received from the display driver 21. The display panel 25 may be, for example, a liquid crystal display (LCD) panel, a light emitting diode (LED) display panel, an organic LED (OLED) display panel, or an active matrix OLED (AMO-LED) display panel.

An external memory 30 stores program instructions executed in the SoC 10. The external memory 30 may also store image data for displaying still images or a moving image (e.g., a video) on the display device 20. The moving image is a sequence of different still images presented for a short time. The external memory 30 may be a volatile or non-volatile memory. The volatile memory may be, for example, dynamic random access memory (DRAM), static RAM (SRAM), thyristor RAM (T-RAM), zero capacitor RAM (Z-RAM), or twin transistor RAM (TTRAM). The non-volatile memory may be, for example, electrically erasable programmable read-only memory (EEPROM), flash memory, magnetic RAM (MRAM), phase-change RAM (PRAM), or resistive memory.

The SoC 10 controls the external memory 30 and/or the display device 20. The SoC 10 may be referred to as an IC, a processor, an application processor, a multimedia processor, or an integrated multimedia processor.

Figure 2:
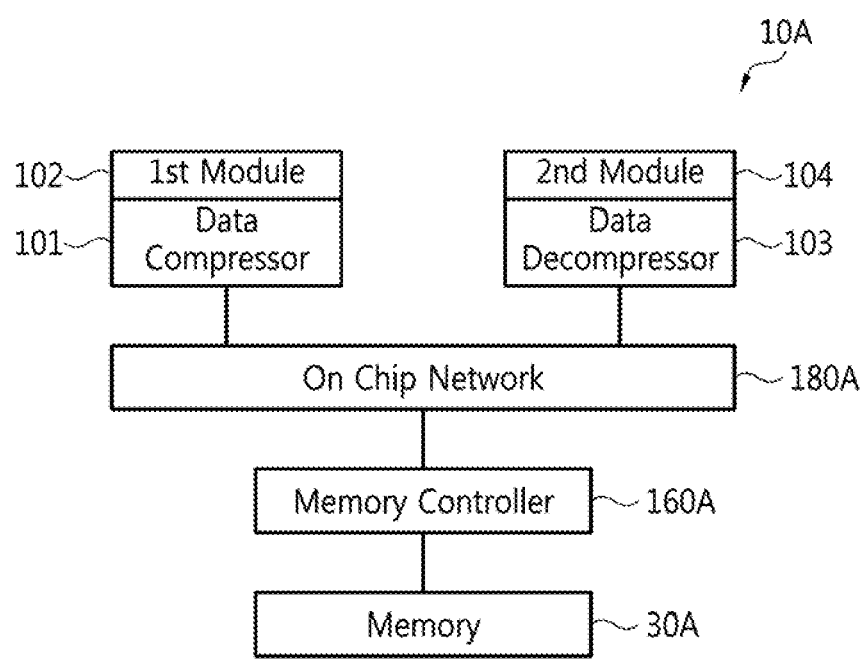
FIG. 2 is a block diagram of an example of a system-on-chip (SoC) illustrated in FIG. 1 according to an exemplary embodiment of the inventive concept.

FIG. 2 is a block diagram of an example 10A of the SoC 10 illustrated in FIG. 1 according to an exemplary embodiment of the inventive concept. Referring to FIGS. 1 and 2, the SoC 10A may include first and second bus interface modules 101 and 103 (e.g., first and second bus interface circuits 101 and 103), first and second function modules 102 and 104 (e.g., first and second function circuits 102 and 104), an on-chip network 180A, a memory controller 160A, and a memory 30A.

The first function module 102 may generate data to be stored in the memory 30A and may store the data in the memory 30A through the first bus interface module 101 and the on-chip network 180A. The first function module 102 may include a central processing unit CPU (100 in FIG. 3), an image signal processor (ISP) (130 in FIG. 3), a graphics processing unit (GPU) (150 in FIG. 3), and a post processor (170 in FIG. 3). However, exemplary embodiments of the inventive concept are not limited thereto.

The first bus interface module 101 may compress data output from the first function module 102 and may transmit the compressed data to the memory controller 160A through the on-chip network 180A to store the compressed data. Thus, the first bus interface module 101 may be referred to as a data compressor. Although the first bus interface module 101 is disposed between the first function module 102 and the on-chip network 180A in the exemplary embodiment illustrated in FIG. 2, the location of the first bus interface module 101 is not limited thereto. For example, in exemplary embodiments, the first bus interface module 101 may be disposed within the first function module 102.

The second function module 104 may receive data from the memory 30A and process the data. The second function module 104 may request data stored in the memory 30A from the on-chip network 180A through the second bus interface module 103 and may receive the data through the on-chip network 180A. The second function module 104 may include the ISP 130 (see FIG. 3), a display controller (140 in FIG. 3), and the post processor 170 (see FIG. 3). However, exemplary embodiments of the inventive concept are not limited thereto.

The second bus interface module 103 may send a data request signal to the on-chip network 180A to receive the data requested by the second function module 104 from the memory 30A. The second bus interface module 103 may receive compressed data, which has been read from the memory 30A in response to the data request signal, through the on-chip network 180A, and may decode the compressed data to decompress the data. The second bus interface module 103 may provide the decoded or decompressed data to the second function module 104. Thus, the second bus interface module 103 may be referred to as a data decompressor.

Although the second bus interface module 103 is disposed between the second function module 104 and the on-chip network 180A in the exemplary embodiment illustrated in FIG. 2, the location of the second bus interface 104 is not limited thereto. For example, in exemplary embodiments, the second bus interface module 103 may be disposed within the second function module 104. According to exemplary embodiments, the memory 30A may be provided within the SoC 10A or external from the SoC 10A.

Figure 3:
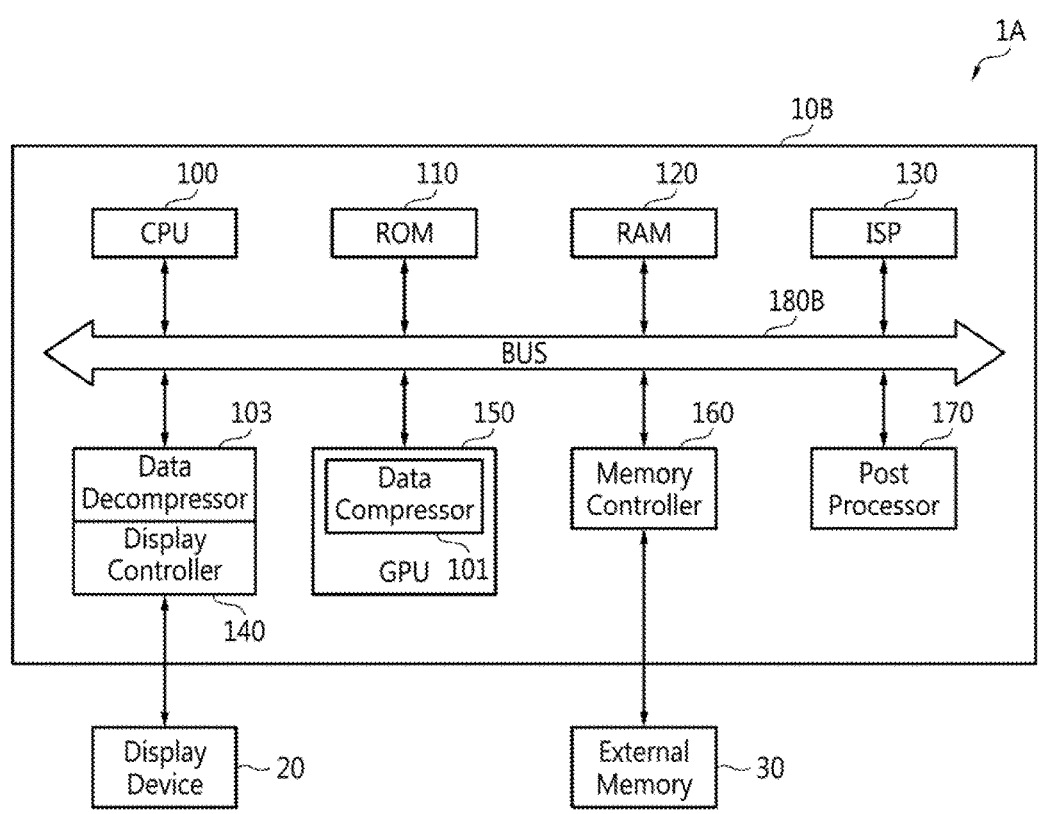
FIG. 3 is a block diagram of another example of the SoC illustrated in FIG. 1 according to an exemplary embodiment of the inventive concept.

FIG. 3 is a block diagram of another example 10B of the SoC 10 illustrated in FIG. 1 according to an exemplary embodiment of the inventive concept. Referring to FIGS. 1 and 3, the SoC 10B may include the CPU 100, a ROM 110, a RAM 120, the ISP 130, the display controller 140, the GPU 150, a memory controller 160, the post processor 170, and a system bus 180B. The SoC 10B may also include other elements apart from those elements illustrated in FIG. 3.

The CPU 100, which may also be referred to herein as a processor, may process or execute programs and/or data stored in the external memory 30. For example, the CPU 100 may process or execute the programs and/or the data in response to an operating clock signal output from a clock signal module. The CPU 100 may be implemented as, for example, a multi-core processor. The multi-core processor is a single computing component with two or more independent actual processors (referred to as cores). Each of the processors reads and executes program instructions.

The CPU 100 runs an operating system (OS). The OS may manage resources (such as memory and display) of the electronic system 1. The OS may distribute the resources to applications executed in the electronic system 1A.

Programs and/or data stored in the ROM 110, the RAM 120, and/or the external memory 30 may be loaded to a memory in the CPU 100 when necessary. The ROM 110 may store programs and/or data (e.g., persistent programs and/or data). The ROM 110 may be implemented as, for example, erasable programmable ROM (EPROM) or EEPROM.

The RAM 120 may temporarily store programs, data, or instructions. The programs and/or data stored in the memory 110 or 30 may be temporarily stored in the RAM 120 according to the control of the CPU 100 or a booting code stored in the ROM 110. The RAM 120 may be implemented as, for example, DRAM or SRAM.

The ISP 130 may perform various kinds of image signal processing. The ISP 130 may process image data received from an image sensor. For example, the ISP 130 may perform shake correction and white balance on the image data received from the image sensor. The ISP 130 may also perform color correction in terms of, for example, brightness or contrast, color harmony, quantization, color conversion into a different color space, etc. The ISP 130 may periodically store the processed image data in the external memory 30 via the system bus 180B.

The GPU 150 may read and execute program instructions used for graphics processing. The GPU 150 may perform graphical processing at a high speed. The GPU 150 may also convert data read by the memory controller 160 from the external memory 30 into a signal suitable for the display device 20. In addition to the GPU 160, a graphics engine or a graphics accelerator may also be used for graphics processing.

The GPU 150 may include the first bus interface module 101. The first bus interface module 101 may compress data, which is generated by the GPU 150 to be stored in the memory 30, and transmit the compressed data to the memory controller 160 through the system bus 180B.

The post processor 170 may perform post processing on an image or an image signal to make the image or image signal suitable for an output device (e.g., the display device 20). The post processor 170 may enlarge, reduce, or rotate an image to be suitable for output. The post processor 170 may store the post-processed image data in the external memory 30 via the system bus 180B, or may directly output the post-processed image to the display controller 140 on the fly.

The memory controller 160 interfaces with the external memory 30. The memory controller 160 controls the overall operation of the external memory 30 and controls data exchange between a host and the external memory 30. For example, the memory controller 160 may write data to or read data from the external memory 30 at the request of the host. The host may be a master device such as, for example, the CPU 100, the ISP 130, the GPU 150, or the display controller 140. The memory controller 160 may read image data from the external memory 30 and provide the image data to the display controller 140 in response to an image data request of the display controller 140.

The display controller 140 controls the operations of the display device 20. The display controller 140 receives image data to be displayed on the display device 20 via the system bus 180B, converts the image data into a signal (e.g., a signal complying with an interface standard) for the display device 20, and transmits the signal to the display device 20. The display controller 140 may request image data from the memory controller 160 and may receive the image data.

The second bus interface module 103 transmits a memory request signal for requesting data to the memory controller 160 through the system bus 180B according to the data request of the display controller 140. The second bus interface module 103 may merge data requests generated by the display controller 140 before transmitting them to the system bus 180B to increase the efficiency of the system bus 180B, which will be described in detail later. In addition, the second bus interface module 103 may receive compressed data read from the memory 30 through the system bus 180B and may decompress the compressed data before providing it to the display controller 140.

The elements 100, 110, 120, 130, 140, 150, 160, and 170 may communicate with one another via the system bus 180B. For example, the system bus 180B connects to each of the elements 100, 110, 120, 130, 140, 150, 160, and 170 to function as a path for data transmission between elements.

The system bus 180B may also function as a path for transmission of a control signal between elements.

The system bus 180B may include, for example, a data bus for transmitting data, an address bus for transmitting an address signal, and a control bus for transmitting a control signal. The system bus 180B may include a small-scale bus, e.g., an interconnector for data communication between predetermined elements. The system bus 180B corresponds to the on-chip network 180A illustrated in FIG. 2. The system bus 180B may be implemented, for example, as an advanced microcontroller bus architecture (AMBA) advance extensible interface (AXI) bus. However, exemplary embodiments of the inventive concept are not limited thereto.

FIG. 4 is a flowchart of a method of operating an SoC according to exemplary embodiments of the inventive concept. The method illustrated in FIG. 4 may be performed, for example, by the SoC 10B illustrated in FIG. 3. Referring to FIGS. 3 and 4, the GPU 150 compresses data in operation S11 and transmits the compressed data to the memory 30 through the memory controller 160 in operation S12. The memory 30 receives and stores the compressed data in operation S13.

Figure 5A:
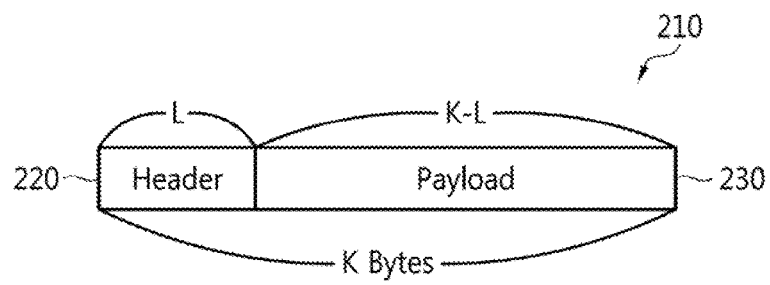
FIG. 5A is a diagram of data compressed using a graphics processing unit (GPU) according to exemplary embodiments of the inventive concept.
Figure 5B:
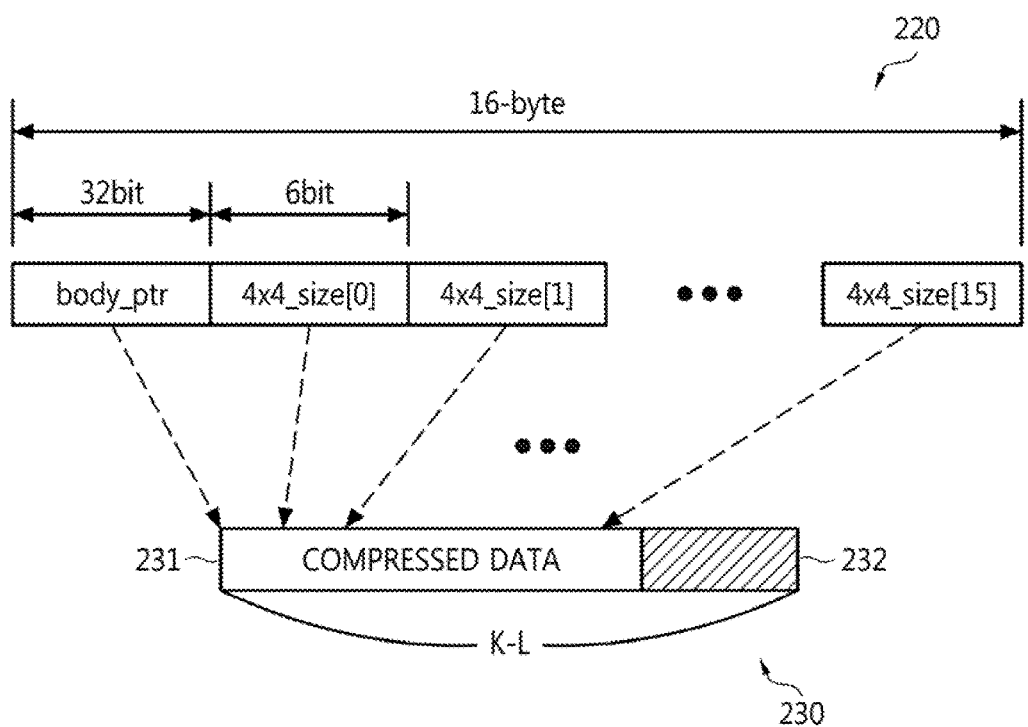
FIG. 5B is a diagram of a header and a payload illustrated in FIG. 5A according to exemplary embodiments of the inventive concept.

FIG. 5A is a diagram of data 210 that has been compressed by the GPU 150 according to exemplary embodiments of the inventive concept. FIG. 5B is a diagram of a header 220 and a payload 230 illustrated in FIG. 5A according to exemplary embodiments of the inventive concept. Referring to FIGS. 5A and 5B, the compressed data 210 may be stored in a unit including the header 220 and the payload 230. For example, the GPU 150 may compress image data in units of blocks of a predetermined size to generate the header 220 and the payload 230. The payload 230 includes compressed data and the header 220 includes address information for designating the compressed data.

When the compressed data 210 is K bytes in size (where K is an integer equal to at least 2), the header 220 may be L bytes in size (where L is an integer equal to at least 1) and the payload 230 may be K−L bytes in size. The size L of the header 220 and the size K−L of the payload 230 may be fixed. In exemplary embodiments, K may be 1 Kbyte and L is 16 bytes, but exemplary embodiments of the inventive concept are not limited thereto.

Referring to FIG. 5B, the header 220 is composed of a total of 16 bytes (e.g., L=16) and may include a 32-bit body pointer body_ptr and first through 16th 6-bit sub-block size information fields 4×4_size[0] through 4×4_size[15]. However, exemplary embodiments of the inventive concept are not limited thereto. For example, the sizes of the header 220 and each field may be changed.

The body pointer body_ptr may indicate a start address of the payload 230. The first through 16th sub-block size information fields 4×4_size[0] through 4×4_size[15] each may include information for defining a sub-block in the payload 230. For example, frame data may be divided into a plurality of block data (e.g., 8*8 or 16*16), which may be managed in units of a plurality of sub-blocks (e.g., 4*4). The sub-block size information fields 4×4_size[0] through 4×4_size[15] for defining sub-block data in the block data may be included in the header 220.

Since the size K−L of the payload 230 is fixed and a data compression rate may be different depending on a frame, a block, or a sub-block, the size of the compressed data is smaller than or the same as the size of the payload 230. Accordingly, as shown in FIG. 5B, only a part 231 of the payload 230 includes compressed data (or valid data) and a remainder 232 of the payload 230 may be empty or may include invalid data.

Referring again to FIG. 4, the display controller 140 may send a first data request to the second bus interface module 103 to request first data necessary for displaying an image or video in operation S14, and then may send a second data request to the second bus interface module 103 to request second data necessary for displaying an image or video in operation S15. According to exemplary embodiments of the inventive concept, the second bus interface module 103 does not make a separate request for data from the memory 30 each time a data request is received from the display controller 140. Rather, the second bus interface module 103 merges at least two data requests from the display controller 140 in operation S16, and sends a merged data request (e.g., a single merged data request signal) to the memory 30 in operation S17. These operations will be described in further detail later. Thus, according to exemplary embodiments of the inventive concept, the second bus interface module 103 does not transmit data requests to the memory 30 in a one-to-one correspondence relative to data requests received from the display controller 140, but rather, merges multiple data requests received from the display controller 140 into a single merged data request that is transmitted to the memory 30. As a result, system efficiency may be improved.

The second bus interface module 103 receives data from the memory 30 in operation S18. Data stored in the memory 30 is compressed data, as described above with reference to FIGS. 5A and 5B. The second bus interface module 103 decompresses the data in operation S19 and provides the decompressed data for the display controller 140 in operation S20.

Figure 6:
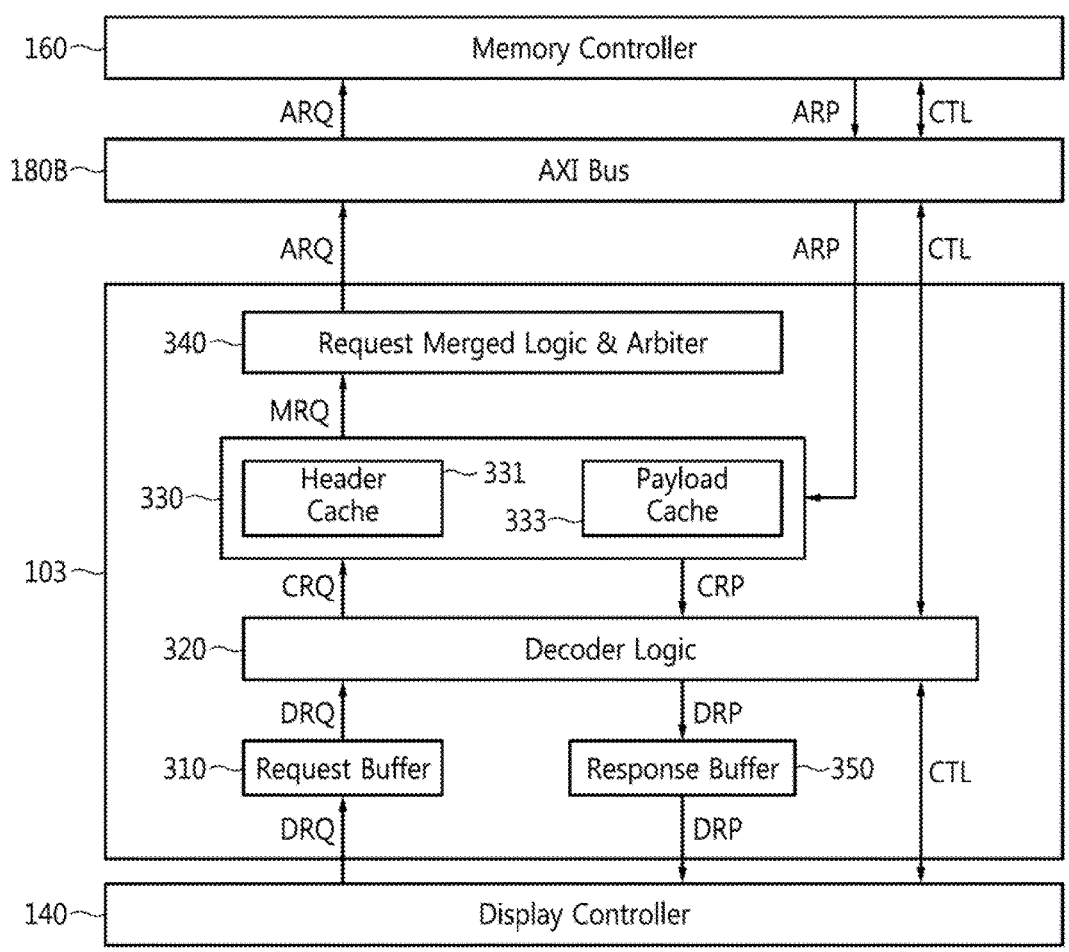
FIG. 6 is a block diagram of a bus interface module according to exemplary embodiments of the inventive concept.

FIG. 6 is a block diagram of the bus interface module 103 according to exemplary embodiments of the inventive concept. Referring to FIG. 6, the bus interface module 103 may include a request buffer 310, a decoder logic 320, a cache 330, a request merger 340 (e.g., request merger circuit 340) (also referred to as a request merged logic and & arbiter 340), and a response buffer 350.

The request buffer 310 stores a data request signal DRQ output from the display controller 140. The request buffer 310 may be, for example, a first-in first-out (FIFO) buffer which stores the data request signal DRQ in the order in which it is output from the display controller 140, and which outputs the data request signal DRQ in the order in which it is stored. However, exemplary embodiments of the inventive concept are not limited thereto. The data request signal DRQ is used for requesting a part of or the entirety of frame data used by the display controller 140 to perform a display operation on the display device 20, and may include information about necessary data. For example, the data request signal DRQ may include start address information (e.g., information indicating a start pixel) and end address information (e.g., information indicating an end pixel) of data necessary for a display operation. However, exemplary embodiments of the inventive concept are not limited to this example.

The decoder logic 320 (e.g., decoder logic circuit 320) analyzes the data request signal DRQ and determines whether it is necessary to send a data request to the memory controller 160. For these operations, the decoder logic 320 may determine whether data (hereinafter referred to as "requested data") corresponding to the data request signal DRQ has been stored in the cache 330. For example, the decoder logic 320 may send a query CRQ regarding whether the requested data has been stored in the cache 330 to the cache 330 and may receive a response. The cache 330 is a buffer memory which temporarily stores data received from the memory 30. The cache 330 may include a header cache 331 which stores address information and a payload cache 333 which stores data (e.g., data including image information for an image to be displayed). Control signals CTL may be communicated between the display controller 140, the bus interface module 103, the system bus 180b, and the memory controller 160 to facilitate communication between these elements.

Figure 7:
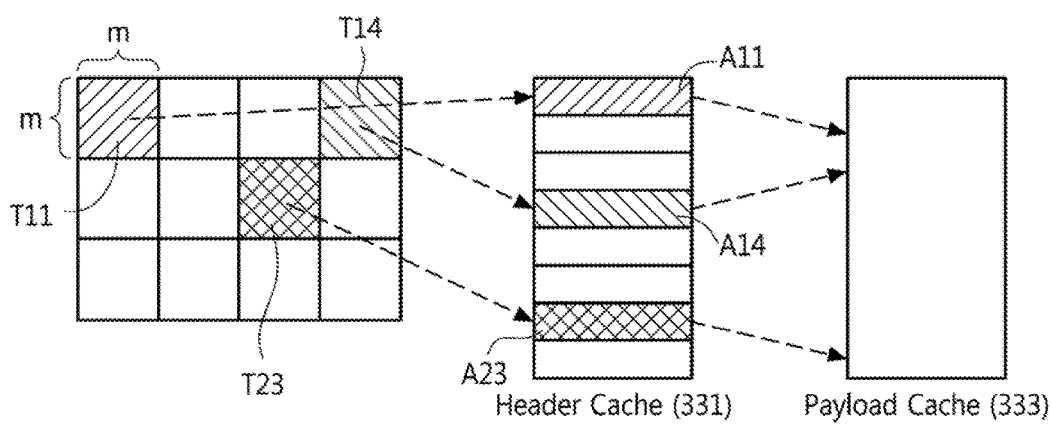
FIG. 7 is a diagram of a header cache and a payload cache according to exemplary embodiments of the inventive concept.
Figure 8:
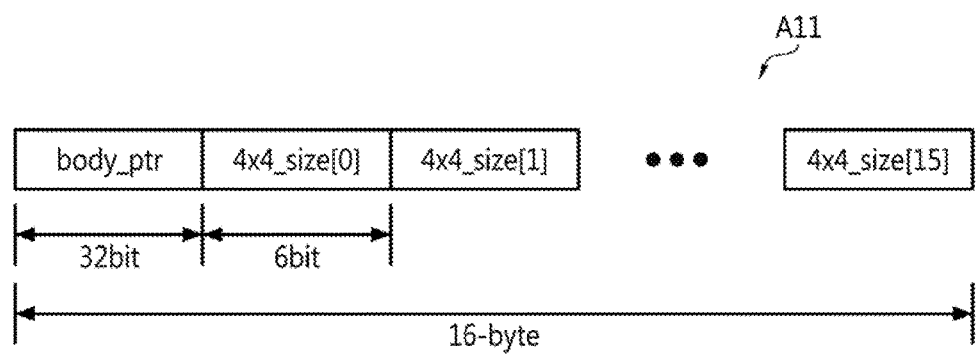
FIG. 8 is a diagram of an address entry illustrated in FIG. 7 according to exemplary embodiments of the inventive concept.

FIG. 7 is a diagram of the header cache 331 and the payload cache 333 according to exemplary embodiments of the inventive concept. FIG. 8 is a diagram of an address entry illustrated in FIG. 7 according to exemplary embodiments of the inventive concept.

Referring to FIGS. 7 and 8, the header cache 331 may include a plurality of address entries A11, A14, and A23. The header cache 331 may store address information (e.g., information of the header 220 illustrated in FIG. 5A) of frame data stored in the memory 30 in units of block data.

As illustrated in FIGS. 5A and 5B, frame data may be stored in the memory 30 in units of blocks of m*m pixel data (where m is an integer equal to at least 2). Addresses may also be managed by block data. For example, the address entry A11 for first block data T11, the address entry A14 for second block data T14, and the address entry A23 for third block data T23 may be stored in the header cache 331. Each of the address entries A11, A14, and A23 includes an address designating block data (e.g., a block data address) and may include at least two fields.

Referring to FIG. 8, each address entry (e.g., A11, A14, A23) is composed of a total of 16 bytes, and may include the 32-bit body pointer body_ptr and the first through 16th 6-bit sub-block size information fields 4×4_size[0] through 4×4_size[15]. However, exemplary embodiments of the inventive concept are not limited thereto. For example, the size of an address entry and the size of each field may be changed.

The body pointer body_ptr may indicate a start address of current block data. The first through 16th sub-block size information fields 4×4_size[0] through 4×4_size[15] may include information for designating respective sub-blocks in the current block data. For example, 16*16 block data may be managed in units of 4*4 sub-blocks. In exemplary embodiments, the sub-block size information fields 4×4_size[0] through 4×4_size[15] for designating respective sub-block data in the current block data are included in an address entry.

The decoder logic 320 may first determine whether an address of the requested data has been stored in the header cache 331. When it is determined that the address of the requested data has been stored in the header cache 331 (which is referred to as a "header cache hit"), the decoder logic 320 determines whether the requested data has been stored in the payload cache 333 using header data (e.g., an address entry of the header cache 331). However, when it is determined that the address of the requested data has not been stored in the header cache 331 (which is referred to as a "header cache miss"), the decoder logic 320 may send a request to the memory controller 160.

Data corresponding to each address entry may or may not exist in the payload cache 333. When data corresponding to an address entry exists in the payload cache 333, it is referred to as a payload cache hit. When data corresponding to an address entry does not exist in the payload cache 333, it is referred to as a payload cache miss.

In the case of a payload cache hit, the decoder logic 320 reads requested data from the payload cache 333 and decodes read data CRP to decompress it. The decoder logic 320 stores decompressed data DRP in the response buffer 350. The response buffer 350 is a buffer which stores data requested by the display controller 140, e.g., the response data DRP corresponding to the data request signal DRQ. The response data DRP is provided to the display controller 140 through the response buffer 350.

In the case of a payload cache miss, the decoder logic 320 sends a data request signal MRQ to the request merger 340 since data is to be requested from the memory controller 160. The data request signal MRQ may include address information and the data size of requested data.

The request merger 340 determines whether the data request signal MRQ satisfies a request condition based on the size and/or address of the requested data. For example, the request merger 340 may determine whether the size of the requested data is smaller than a predetermined threshold to determine whether the data request signal MRQ satisfies the request condition.

When it is determined that the data request signal MRQ satisfies the request condition, the request merger 340 sends a memory request signal ARQ for requesting data stored in the memory 30 to the bus 180B. The memory request signal ARQ is transmitted to the memory controller 160 through the bus 180B.

The memory request signal ARQ is a signal generated by the bus interface module 103 to request data (e.g., compressed data compressed and stored by the GPU 150) stored in the memory 30. The memory request signal ARQ may include information about the requested data. The memory request signal ARQ may include information such as, for example, address information and data size of the requested data in a format that is compatible with the bus 180B, and may also include control information and additional information about the data request. The data size information may include information about a burst length. A burst size (e.g., the number of bits in burst data) may be set to, for example, 32, 64, or 128 bits.

The burst length is information indicating the number of burst data sets requested using one memory request signal ARQ. The burst length may be an integer equal to at least 1. When the burst size is 128 bits and the burst length in the memory request signal ARQ is set to 3, the bus interface module 103 may read three burst data sets (e.g., 128*3=384 bits) from the memory 30 using one memory request signal ARQ. The memory controller 160 may read data from the memory 30 in response to the memory request signal ARQ and transmit the data to the bus interface module 103 through the bus 180B. The data read from the memory 30 may be stored in the cache 330 of the bus interface module 103.

When it is determined that the data request signal MRQ does not satisfy the request condition, the request merger 340 does not send the memory request signal ARQ immediately to the bus 180B. Rather, the request merger 340 waits for another data request signal. For example, when the size of data requested by a first data request signal is smaller than a predetermined threshold, the request merger 340 may wait for another data request signal (e.g., a second data request signal) and may then merge the first and second data request signals into one memory request signal ARQ.

The predetermined threshold may be based on a variety of different factors and may be a predetermined data size. For example, the threshold may be the size of a particular internal buffer, a maximum size of data which can be requested from the memory controller 160 at a time, or a maximum data size supported by the bus 180B. In an exemplary embodiment, the threshold may be set to the burst length. A threshold burst length may be set to, for example, 4, 8, or 16. The request merger 340 may transmit the memory request signal ARQ to the bus 180B only when the size of the request data reaches the threshold.

For example, when the threshold burst length is set to 4 and the burst length of data to be requested from the memory 30 reaches 4, the request merger 340 may transmit the memory request signal ARQ to the bus 180B. Consequently, instead of transmitting the memory request signal ARQ to the bus 180B every time a data request from the memory controller 160 is necessary, the request merger 340 transmits the memory request signal ARQ to the bus 180B only when the burst length of the requested data is at least the predetermined threshold burst length, thereby efficiently using the bus 180B.

In an exemplary embodiment, the request merger 340 may merge the first data request signal and the second data request signal only when the addresses of first and second requested data corresponding to the first and second data request signals increase linearly. In other cases, the request merger 340 may separately transmit the memory request signal ARQ corresponding to the first data request signal and the memory request signal ARQ corresponding to the second data request signal. The address of the first requested data and the address of the second requested data increasing linearly means that the first and second requested data are consecutive. Thus, according to exemplary embodiments of the inventive concept, the request merger 340 may merge the first data request signal and the second data request signal only when the addresses of first and second requested data corresponding to the first and second data request signals are consecutive (e.g., when the addresses of the first and second data indicate that the first and second data are stored consecutively without other intervening data). The number of consecutive addresses needed to perform the merge operation may vary according to exemplary embodiments.

There may be a limit to the number of waits, which is referred to as a wait count. For example, when the wait count is set to N (where N is an integer equal to at least 1), the request merger 340 may wait for a data request signal up to N times.

As described above, according to exemplary embodiments of the inventive concept, the bus interface module 103 does not transmit the memory request signal ARQ to the bus 180B each time a data request occurs, but rather, merges at least two data requests into one memory request signal ARQ according to whether the request condition(s) are satisfied. The merged single memory request signal ARQ is then transmitted to the bus 180B (instead of separate, individual memory request signals), thereby increasing bus efficiency. Thus, inefficiency in memory access and bus transmission which may occur as a result of small-size data being requested from the memory controller 160 many times may be reduced according to exemplary embodiments of the inventive concept.

The memory controller 160 reads data ARP from the memory 30 in response to the memory request signal ARQ and transmits the data ARP to the bus interface module 103 through the bus 180B. The data ARP read from the memory 30 is stored in the payload cache 333 of the bus interface module 103.

The decoder logic 320 reads data from the cache 333 and decodes the read data CRP to decompress the data CRP. The decoder logic 320 stores decompressed data DRP in the response buffer 350.

Figure 9:
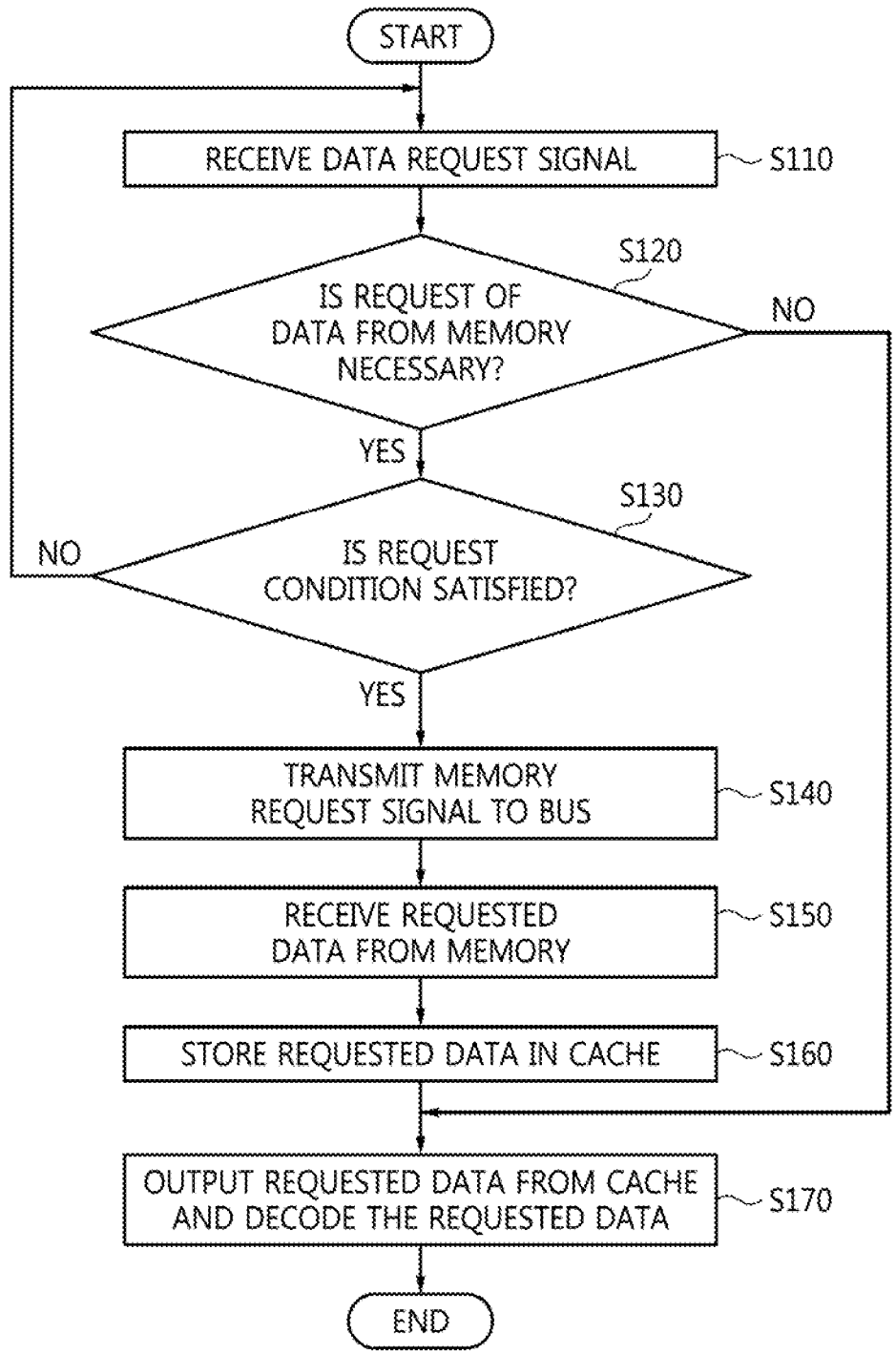
FIG. 9 is a flowchart of a method of operating a buffer interface module according to exemplary embodiments of the inventive concept.

FIG. 9 is a flowchart of a method of operating a buffer interface module according to exemplary embodiments of the inventive concept. The method illustrated in FIG. 9 may be performed, for example, by the bus interface module 103 illustrated in FIG. 6.

Referring to FIGS. 6 and 9, when the bus interface module 103 receives the first data request signal DRQ from the display controller 140 in operation S110, the bus interface module 103 determines whether a first data request needs to be sent to the memory controller 160 in operation S120. As described above, whether the first data request is necessary may be determined by checking whether first data has been stored in the cache 330. When address information regarding the first data has been stored in the header cache 331 and the first data has been stored in the payload cache 333, it may be determined that the first data request does not need to be sent to the memory controller 160. That is, in exemplary embodiments, a data request is necessary when corresponding data is not currently available (e.g., is not stored in the cache 330) and is not necessary when corresponding data is currently available (e.g., is stored in the cache 330).

When it is determined that the first data request needs to be sent to the memory controller 160, whether a request condition is satisfied is determined in operation S130. Determining whether the request condition is satisfied may be performed, for example, by comparing the size of the first data with a threshold. As described above, the threshold may be set to a burst length. A threshold burst length may be set to, for example, 4, 8, or 16.

When the threshold burst length is set to 4, the request merger 340 may compare the size (e.g., the burst length) of the first data with the threshold burst length of 4 and determines whether the size of the first data is at least 4. When the size of the first data is at least 4, the request merger 340 may determine that the request condition is satisfied and transmit the memory request signal ARQ to the bus 180B. When the request condition is satisfied, the request merger 340 sends the first memory request signal ARQ for requesting the first data from the memory 30 to the bus 180B in operation S140.

When the request condition is not satisfied, the bus interface module 103 waits for the next data request signal (e.g., a second data request signal). For example, when the burst length of the first data is less than 4, the bus interface module 103 waits for the second data request signal. When the bus interface module 103 receives the second data request signal in operation S110, it is determined whether a second data request needs to be sent to the memory controller 160 in operation S120. When it is determined that the second data request needs to be sent to the memory controller 160 (e.g., in case of YES) in operation S120, the first data request and the second data request are merged, and it is determined whether the merged request satisfies the request condition in operation S130. For example, when the threshold burst length is set to 4, the request merger 340 may compare the sum of the size of the first data and the size of the second data (e.g., the sum of the burst length of the first data and the burst length of the second data) with the threshold burst length of 4 and may determine whether the sum is at least 4. When the sum is at least 4, it is determined that the request condition is satisfied, and the memory request signal ARQ for requesting both the first data and the second data is sent to the bus 180B in operation S140.

In exemplary embodiments, the first data request and the second data request may be merged into a merged request only when the first data and the second data are consecutive. For example, in exemplary embodiments, the first data request and the second data request are merged only when an address of the first data and an address of the second data are consecutive.

When the merged request does not satisfy the request condition (e.g., in case of NO) in operation S130, the bus interface module 103 waits for the next data request signal (e.g., a third data request signal). The maximum number of waits for a data request signal (e.g., a maximum wait count) may be predetermined.

The memory request signal ARQ including the merged request is transmitted to the bus 180B in operation S140. Requested data from the memory controller 160 may be received from the memory 30 in operation S150 and stored in the cache 330 in operation S160. The data stored in the cache 330 is decompressed and provided to the display controller 140 in operation S170.

Figure 10:
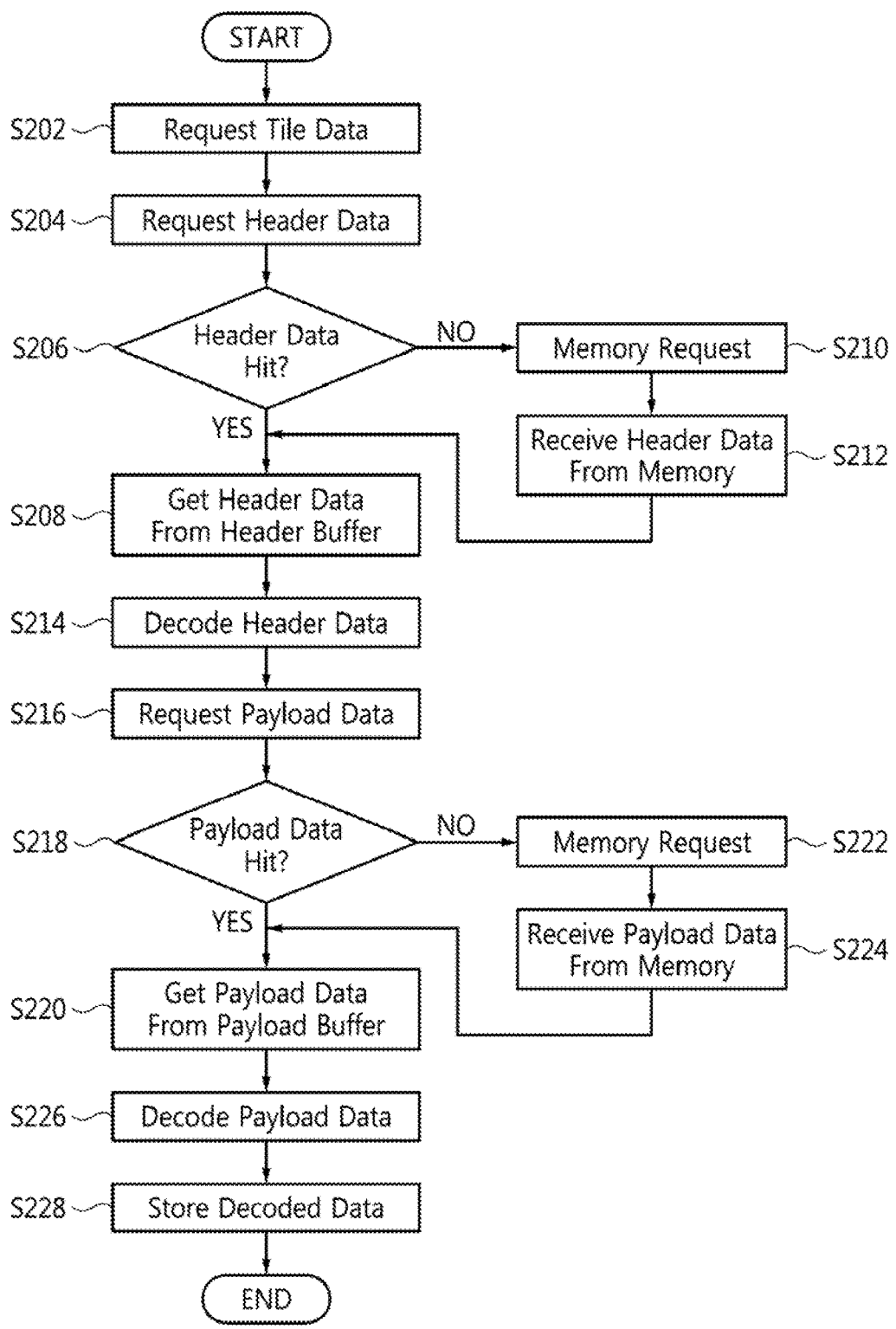
FIG. 10 is a flowchart of a method of operating a buffer interface module according to exemplary embodiments of the inventive concept.

FIG. 10 is a flowchart of a method of operating a buffer interface module according to exemplary embodiments of the inventive concept. The method illustrated in FIG. 10 may be performed, for example, by the bus interface module 103 illustrated in FIGS. 2, 3, and 6.

Referring to FIGS. 2, 3, 6, and 10, the bus interface module 103 may receive the request signal DRQ requesting tile data from the memory controller 160 in operation S202. The tile data may be, for example, block data described with reference to FIGS. 5A and 5B.

The bus interface module 103 may request header data corresponding to the requested tile data from the header cache 331 in operation S204 and determine whether the header data has been stored in the header cache 331 (e.g., determine whether a header data hit has occurred) in operation S206. The header data may include address information corresponding to the tile data, as described above.

When it is determined that a header data hit has occurred (e.g., in case of YES) in operation S206, the bus interface module 103 fetches the header data from the header cache 331 in operation S208. When it is determined that a header data miss has occurred (e.g., in case of NO) in operation S206, the bus interface module 103 may request the header data from the memory 30 in operation S210, may receive the header data from the memory 30 and store the header data in the header cache 331 in operation S212, and may fetch the header data from the header cache 331 in operation S208.

The bus interface module 103 decodes the header data in operation S214, requests payload data from the payload cache 333 in operation S216, and determines whether a payload data hit has occurred in operation S218. The bus interface module 103 may determine whether a payload data hit has occurred by checking whether payload data corresponding to the header data has been stored in the payload cache 333 in operation S218.

When it is determined that a payload data hit has occurred (e.g., in case of YES) in operation S218, the payload data may be fetched from the payload cache 333 in operation S220. When it is determined that a payload data miss has occurred (e.g., in case of NO) in operation S218, the bus interface module 103 may request the payload data from the memory 30 in operation S222. At this time, the bus interface module 103 may transmit a merged request signal for requesting a plurality of payload data to the bus 180B (e.g., the bus interface module 103 may transmit a single merged request signal for requesting a plurality of payload data at substantially the same time to the bus 180B).

The bus interface module 103 receives the payload data from the memory 30 and stores the payload data in the payload cache 333 in operation S224, and then fetches the payload data from the payload cache 333 in operation S220.

The bus interface module 103 may decode the payload data and provide the decoded data to the display controller 140 in operation S226. The decompressed data DRP is stored in the response buffer 350 in operation S228.

Figure 11:
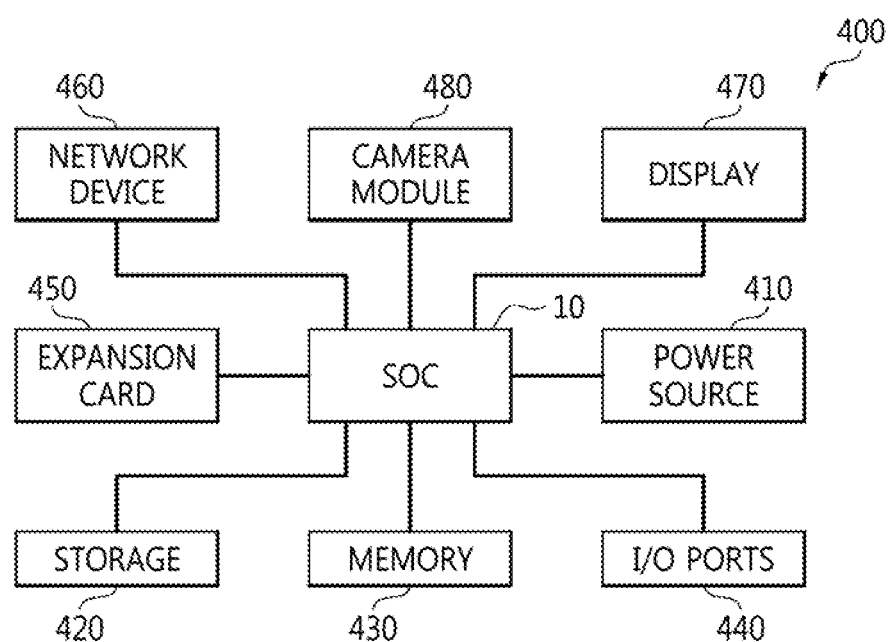
FIG. 11 is a block diagram of an electronic system including the SoC according to exemplary embodiments of the inventive concept.

FIG. 11 is a block diagram of an electronic system 400 including the SoC according to exemplary embodiments of the inventive concept. Referring to FIG. 11, the electronic system 400 may be implemented as, for example, a PC, a data server, a laptop computer or a portable device. The portable device may be, for example, a cellular phone, a smartphone, a tablet personal computer (PC), a personal digital assistant (PDA), an enterprise digital assistant (EDA), a digital still camera, a digital video camera, a portable multimedia player (PMP), a portable navigation device (PDN), a handheld game console, or an electronic book (eBook) device.

The electronic system 400 includes the SoC 10, a power source 410, a storage device 420, a memory 430, I/O ports 440, an expansion card 450, a network device 460, and a display 470. The electronic system 400 may further include a camera module 480.

The SoC 10 may control the operation of at least one of the elements 410 through 480. The SoC 10 corresponds to the SoC 10 illustrated in FIG. 1 or FIG. 2. The power source 410 may supply an operating voltage to at least one of the elements 10 and 420 through 480. The storage device 420 may be implemented by, for example, a hard disk drive (HDD) or a solid state drive (SSD).

The memory 430 may be implemented by, for example, a volatile or non-volatile memory. A memory controller that controls a data access operation (e.g., a read operation, a write operation (or a program operation), or an erase operation) on the memory 430 may be integrated into or embedded in the SoC 10. Alternatively, the memory controller may be provided between the SoC 10 and the memory 430.

The I/O ports 440 are ports that receive data transmitted to the electronic system 400 or transmit data from the electronic system 400 to an external device. For example, the I/O ports 440 may include a port connecting with a pointing device such as a computer mouse, a port connecting with a printer, and a port connecting with a USB drive.

The expansion card 450 may be implemented as a secure digital (SD) card or a multimedia card (MMC). The expansion card 450 may be a subscriber identity module (SIM) card or a universal SIM (USIM) card.

The network device 460 enables the electronic system 400 to be connected with a wired or wireless network. The display 470 displays data output from the storage device 420, the memory 430, the I/O ports 440, the expansion card 450, or the network device 460.

The camera module 480 converts optical images into electrical images. Accordingly, the electrical images output from the camera module 480 may be stored in the storage module 320, the memory 430, or the expansion card 450. Also, the electrical images output from the camera module 480 may be displayed through the display 470.

Exemplary embodiments of the inventive concept may be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium may be distributed over network coupled computer systems so that the computer-readable code is stored and executed in a distributed fashion. Functional programs, codes, and code segments to accomplish exemplary embodiments of the inventive concept can be construed by computer programmers.

As described above, in a method of operating a bus interface device according to exemplary embodiments of the inventive concept, a memory request signal is not transmitted to a bus every time a data request for memory is generated. Rather, at least two data requests are merged and one memory request signal is transmitted to the bus, thereby increasing bus efficiency.

While the inventive concept has been particularly shown and described with reference to the exemplary embodiments thereof, it will be understood by those of ordinary skill in the art that various changes in form and detail may be made therein without departing from the spirit and scope of the inventive concept as defined by the following claims.

What is claimed is:

1. A bus interface device for requesting and receiving data from a memory controller connected to a bus, the bus interface device comprising:
   a request buffer configured to store a first data request signal for requesting first data and a second data request signal for requesting second data; and
   a request merger configured to determine whether to merge the first and second data request signals, and transmit a merged request signal for requesting the first data and the second data from the memory controller to the bus upon determining that the first and second data request signals are to be merged,
   wherein the request merger determines whether to merge the first and second data request signals by comparing a size of the first data to a maximum data size supported by the bus,
   wherein the request merger merges the first and second data request signals when the size of the first data is less than the maximum data size supported by the bus,
   wherein the first data and the second data are compressed prior to the first data request signal and the second data request signal being merged.

2. The bus interface device of claim 1, further comprising:
   a cache; and
   a decoder logic circuit configured to receive the first and second data from the memory controller, store the first and second data in the cache, and decompress the first and second data,
   wherein the first and second data are compressed by a graphics processing unit (GPU) prior to the decoder logic circuit decompressing the first and second data.

3. The bus interface device of claim 2, wherein the request merger merges the first and second data request signals when the first and second data are consecutive, and does not merge the first and second data request signals when the first and second data are not consecutive.

4. The bus interface device of claim 2, wherein the request merger waits to receive the second data request signal before transmitting a memory request signal for requesting the first data from the memory controller to the bus when the first data is less than a threshold.

5. The bus interface device of claim 2, wherein the decoder logic circuit analyzes the first data request signal and the second data request signal, determines whether the first and the second data have been stored in the cache, and sends a request for the first and second data to the request merger when the first and the second data have not been stored in the cache.

6. The bus interface device of claim 2, wherein the cache comprises:
   a header cache configured to store address information of the first and second data; and
   a payload cache configured to store the first and second data.

7. A semiconductor integrated circuit device, comprising:
   a bus;
   a memory controller connected to the bus and configured to control a memory; and
   a bus interface module configured to request data from the memory controller through the bus, wherein the bus interface module comprises:
      a request buffer configured to store a first data request signal for requesting first data and a second data request signal for requesting second data; and
      a request merger configured to determine whether to merge the first and second data request signals, and transmit a merged request signal for requesting the first data and the second data from the memory controller to the bus upon determining that the first and second data request signals are to be merged,
   wherein the first and second data are stored in the memory,
   wherein the request merger transmits the merged request signal to the bus in response to determining that a data burst length of the merged request signal is at least a predetermined threshold burst length.

8. The semiconductor integrated circuit device of claim 7, wherein the bus interface module further comprises:
   a cache; and
   a decoder logic circuit configured to receive the first and second data from the memory controller, store the first and second data in the cache, and decompress the first and second data,
   wherein the first and second data are compressed by a graphics processing unit (GPU) prior to the decoder logic circuit decompressing the first and second data.

9. The semiconductor integrated circuit device of claim 8, wherein the request merger merges the first and second data request signals when the first and second data are consecutive, and does not merge the first and second data request signals when the first and second data are not consecutive.

10. The semiconductor integrated circuit device of claim 1, wherein the request merger waits to receive the second data request signal before transmitting a memory request signal for requesting the first data from the memory controller to the bus when the first data is less than the predetermined threshold burst length.

11. The semiconductor integrated circuit device of claim 8, wherein the decoder logic circuit analyzes the first data request signal and the second data request signal,
   determines whether the first and the second data have been stored in the cache, and sends a request for the first and second data to the request merger when the first and the second data have not been stored in the cache.

12. A method of operating a bus interface device for interfacing with a memory through a bus, the method comprising:
   compressing first data and second data by a graphics processing unit (GPU);
   transmitting the first data and the second data from the GPU to the memory;
   receiving a first data request signal corresponding to the first data at a bus interface module, wherein the first data request signal is sent by a display controller;
   receiving a second data request signal corresponding to the second data at the bus interface module, wherein the second data request signal is sent by the display controller;
   determining whether to merge the first and second data request signals by comparing a size of the first data to a maximum size of data that a memory controller controlling the memory is capable of requesting at one time;
   merging the first and second data request signals into a single merged data request signal by the bus interface module when the size of the first data is less than the maximum size of data that the memory controller is capable of requesting at the one time; and
   transmitting the single merged data request signal from the bus interface module to the memory.

13. The method of claim 12, further comprising:
   transmitting the first and second data from the memory to the bus interface module in response to the memory receiving the single merged data request signal.

14. The method of claim 13, wherein the bus interface module is a data decompressor, and the data decompressor decompresses the first and second data upon receiving the first and second data from the memory.

15. The method of claim 14, further comprising:
   transmitting the decompressed first and second data from the data decompressor to the display controller.

* * * * *